United States Patent
Chen

(10) Patent No.: US 7,495,726 B2
(45) Date of Patent: Feb. 24, 2009

(54) TRANSFLECTIVE DISPLAY DEVICE

(75) Inventor: Ga-Lane Chen, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 222 days.

(21) Appl. No.: 11/164,776

(22) Filed: Dec. 5, 2005

(65) Prior Publication Data

US 2006/0197893 A1 Sep. 7, 2006

(30) Foreign Application Priority Data

Dec. 10, 2004 (TW) .............................. 93138253 A

(51) Int. Cl.
*G02F 1/1335* (2006.01)

(52) U.S. Cl. ...................... 349/114; 349/113

(58) Field of Classification Search ................. 349/114, 349/113
See application file for complete search history.

(56) References Cited

U.S. PATENT DOCUMENTS

| | | | | |
|---|---|---|---|---|
| 5,738,918 | A * | 4/1998 | Shen et al. ................... | 428/1.31 |
| 6,199,989 | B1 * | 3/2001 | Maeda et al. ................ | 359/613 |
| 6,628,359 | B1 * | 9/2003 | Terashita et al. ............ | 349/120 |
| 6,678,027 | B2 | 1/2004 | Park et al. | |
| 6,690,438 | B2 * | 2/2004 | Sekiguchi .................... | 349/114 |
| 6,801,274 | B2 * | 10/2004 | Suzuki ......................... | 349/106 |
| 6,825,902 | B2 * | 11/2004 | Kaneko ........................ | 349/114 |
| 2002/0145688 | A1 * | 10/2002 | Sekiguchi .................... | 349/114 |
| 2002/0145689 | A1 * | 10/2002 | Kaneko ........................ | 349/114 |
| 2003/0189402 | A1 * | 10/2003 | Gaudiana et al. ............ | 313/507 |
| 2004/0041082 | A1 * | 3/2004 | Harmon ..................... | 250/214 R |
| 2004/0149759 | A1 * | 8/2004 | Moser et al. ................ | 220/581 |
| 2005/0059766 | A1 * | 3/2005 | Jones et al. ................. | 524/431 |
| 2005/0064091 | A1 * | 3/2005 | Yamazaki .................... | 427/58 |
| 2005/0207017 | A1 * | 9/2005 | Wolfe ......................... | 359/613 |
| 2006/0141268 | A1 * | 6/2006 | Kalkan et al. ............... | 428/446 |
| 2006/0187378 | A1 * | 8/2006 | Bong et al. .................. | 349/69 |
| 2006/0187383 | A1 * | 8/2006 | Broer et al. ................. | 349/113 |
| 2007/0002006 | A1 * | 1/2007 | Edwards ..................... | 345/105 |
| 2007/0097296 | A1 * | 5/2007 | Li et al. ...................... | 349/114 |
| 2007/0182815 | A1 * | 8/2007 | DiFrancesco ................ | 348/97 |
| 2007/0190326 | A1 * | 8/2007 | Perry et al. ................. | 428/403 |

FOREIGN PATENT DOCUMENTS

CN 1348115 A 5/2002

* cited by examiner

*Primary Examiner*—K. Cyrus Kianni
(74) *Attorney, Agent, or Firm*—Winston Hsu

(57) ABSTRACT

A transflective FPD device is provided. The transflective FPD device includes a liquid crystal layer and a transflective layer. The transflective layer includes a matrix made of a transparent material and a plurality of reflective nano-particles. The reflective nano-particles are configured for reflecting ambient light and are dispersed uniformly and randomly in the entire matrix. The transflective layer is adapted for reflecting ambient lights, and as well as for allowing backlight to pass therethrough.

10 Claims, 3 Drawing Sheets

TRANSFLECTIVE DISPLAY DEVICE

CROSS-REFERENCES TO RELATED APPLICATION

This application is related to a copending U.S. patent application entitled "A TRANSFLECTIVE DISPLAY DEVICE" with the same assignee. The disclosure of the above-identified application is incorporated herein by reference.

1. Field of the Invention

The present invention relates to a transflective display device and, particularly, to a transflective flat panel display (FPD) device.

2. Description of Related Art

Conventional FPD devices are generally classified into reflective devices and transmissive devices. A transmissive FPD device displays an image by using light emitted from a backlight source, and a reflective FPD displays an image by using ambient light.

A transmissive FPD device is capable of producing a bright image with a high contrast ratio without being substantially influenced by the brightness of the environment, but such a device consumes a lot of power due to the backlight. Moreover, a transmissive FPD device has a poor visibility under very bright environments (e.g., when used outdoor under a clear sky).

On the other hand, a reflective FPD device consumes little power, but the brightness and the contrast ratio thereof are liable to be influenced by the conditions, under which it is used, e.g., the brightness of the environment. Particularly, the visibility lowers significantly under dark environments.

In order to overcome these problems, transflective FPD devices, which are capable of operating both in a reflection mode and in a transmission mode, have been proposed in the art.

A conventional transflective FPD device typically employs a transflective layer having a typical so-called multi-gap structure. The multi-gap structure is composed of a plurality of reflective means distributed separately, each two of which defines a transmissive gap therebetween. The reflective means are adapted for taking advantages of ambient light, while the gaps are adapted for allowing backlight passage therethrough. However, since parts of the transflective layer are transmissive and the others are not, a conventional transflective FPD usually has no way to give better attention to its transmission ability and its reflection ability. Furthermore, the above-mentioned multi-gap structure is generally disposed above a liquid crystal layer and a color filter layer. As a result, an FPD device having such a configuration typically cannot provide a satisfactory color saturation.

Therefore, what is needed in the art is to provide a transflective FPD device giving better attention to its transmission ability and its reflection ability and having a satisfactory color saturation.

SUMMARY OF INVENTION

According to the present display, a transflective FPD device is provided. The transflective FPD device includes a liquid crystal layer and a transflective layer. The transflective layer includes a matrix made of a transparent material and a plurality of reflective nano-particles. The reflective nano-particles are configured for reflecting ambient light and are dispersed uniformly and randomly in the entire matrix.

An advantage of the FPD device is that the reflective nano-particles provide better and more efficient reflection, and thus less reflection area is needed and more transmission area can be used for transmitting the backlight.

Another advantage of the FPD device is that the transmission/reflection ratio of the transflective layer can be determined by controlling the quantity, size distribution, and reflectivity of the reflective nano-particles.

A further advantage of the FPD device is that better color saturation can be obtained by appropriately designing the reflective nano-particle size distribution.

A still further advantage of the FPD device is that the transflective layer can be integrated as a whole into a thinner substrate, thus saving production cost.

BRIEF DESCRIPTION OF DRAWINGS

The above-mentioned and other features and advantages of the present transflective display device, and the manner of attaining them, will become more apparent and the invention will be better understood by reference to the following description of its embodiments taken in conjunction with the accompanying drawings.

Figure 1:
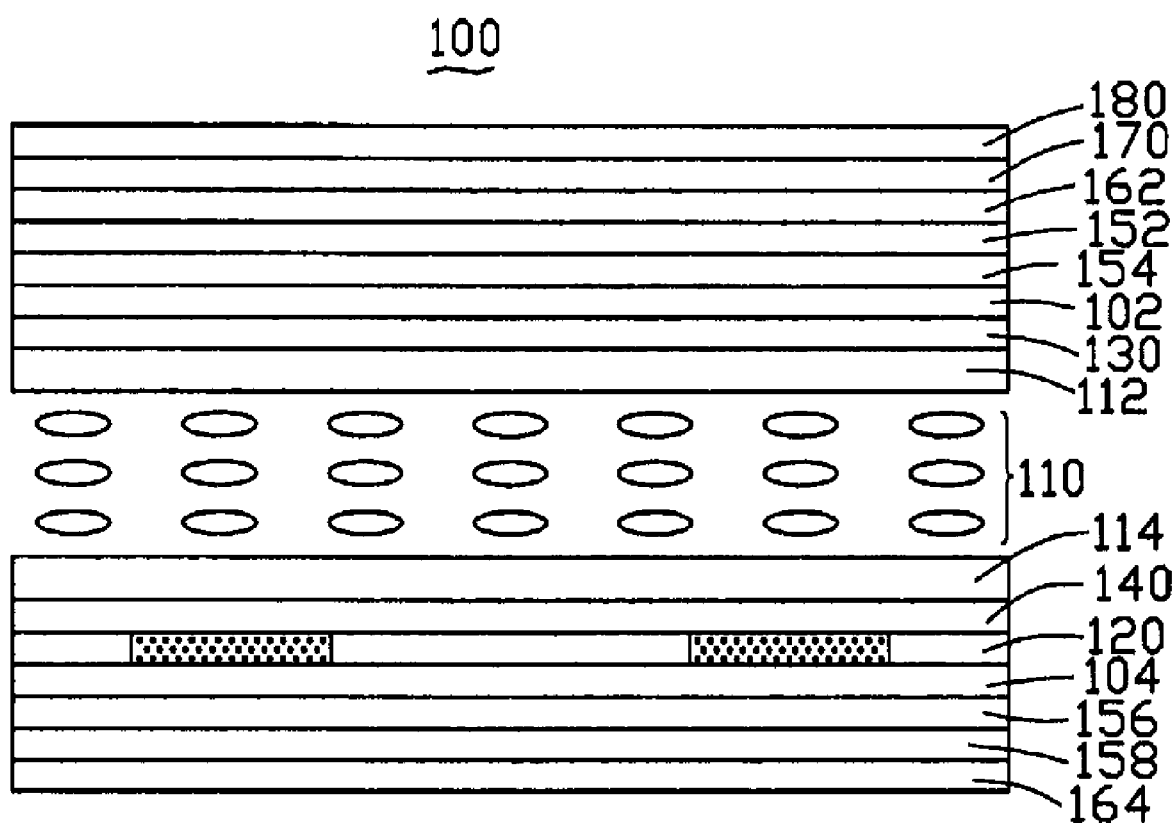
FIG. 1 is a schematic, cutaway view of an FPD device, according to an exemplary embodiment.

Corresponding reference characters indicate corresponding parts throughout the several views. The exemplifications set out herein illustrate at least one preferred embodiment of the present transflective display device, in one form, and such exemplifications are not to be construed as limiting the scope of such a device in any manner.

DETAILED DESCRIPTION

Reference will now be made to the drawings to describe the preferred embodiments of the present FPD device, in detail.

Referring now to the drawings, and more particularly to FIG. 1, there is shown a transflective FPD device 100. The transflective FPD device 100 mainly includes an upper substrate 102, a lower substrate 104, a liquid crystal layer 110, a transflective layer 120, a thin film transistor (TFT) layer 130, a color filter layer 140, an upper polarizer 162, and a lower polarizer 164.

The liquid crystal layer 110 is interposed between the upper substrate 102 and the lower substrate 104 and includes a plurality of liquid crystal molecules. The liquid crystal layer 110 further includes an upper alignment film 112, and a lower alignment film 114. The liquid crystal molecules are received between the upper alignment film 112 and the lower alignment film 114. The upper alignment film 112 and the lower alignment film 114 are adapted for aligning the liquid crystal molecules to control the passage of light therethrough. The transflective layer 120 and the color filter layer 140 are interposed between the liquid crystal layer 110 and the lower substrate 104. The transflective layer 120 is disposed adjacent the lower substrate 104. The color filter layer 140 is disposed adjacent the liquid crystal layer 130. The color filter layer 140 is disposed on the transflective layer 120. The transflective layer 120 is adapted/configured for allowing backlight to transmit therethrough and to then be incident onto the liquid crystal layer 110 and is further adapted/configured for allowing environmental light be reflected back to the liquid crystal layer 110. The TFT layer 130 is interposed between the upper substrate 102 and the liquid crystal layer 110 and is configured for driving the FPD device to display, e.g., a particular image and/or set of alphanumeric characters. The upper polarizer 162 and the lower polarizer 164 are respectively adapted for providing polarized lights for displaying.

In the illustrated exemplary embodiment, the transflective FPD device 100 further includes an upper ½ wave plate 152, an upper ¼ wave plate 154, a lower ¼ wave plate 156, and a lower ½ wave plate 158. The upper ½ wave plate 152 and the upper ¼ wave plate 154 are interposed between the upper substrate 102 and the upper polarizer 162, while the lower ¼ wave plate 156 and the lower ½ wave plate 158 are interposed between the lower substrate 104 and the lower polarizer 164. The positions of the upper ½ wave plate 152 and the upper ¼ wave plate 154 are interchangeable, and the positions of the lower ¼ wave plate 156 and the lower ½ wave plate 158 are also interchangeable. The wave plates 152, 154, 156 and 158 are adapted for complementing a phase delay of the tranflective FPD device 100. It is to be noted that other phase complementary components can also be employed, additionally or alternatively, to perform such a function.

Furthermore, the transflective FPD device 100 may further include an anti-glare coating layer 170 and an anti-reflection coating layer 180. The anti-glare coating layer 170 is disposed on the upper polarizer 162 for eliminating or at least limiting glare caused by excessive strong ambient light. The anti-reflection coating layer 180 is disposed on the anti-glare coating layer 170 for allowing more light having a given wavelength band to pass therethrough.

Figure 2:
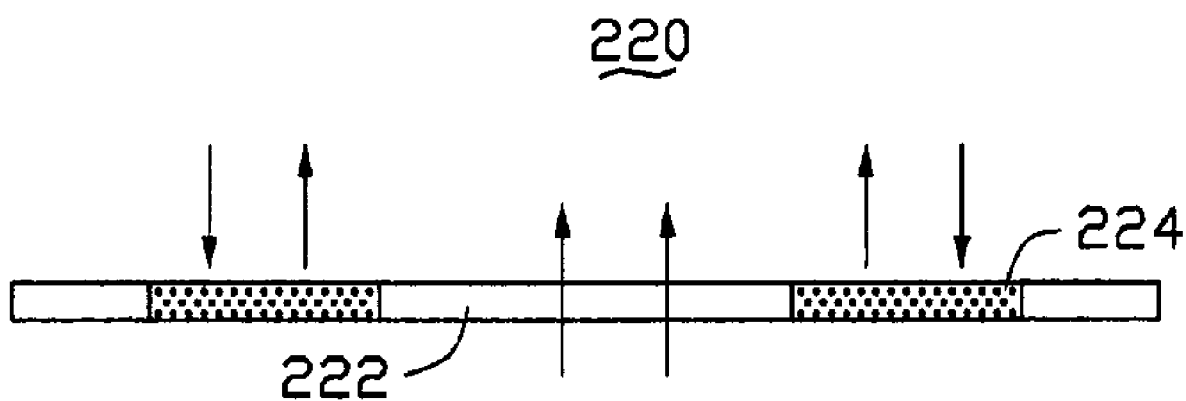
FIG. 2 is a schematic, cross-sectional view of a transflective layer of the FPD device of FIG. 1.

FIG. 2 illustrates an exemplary embodiment of the transflective layer 220. The transflective layer 220 includes a plurality of reflective domains 224 configured for reflecting ambient light for display illumination and further includes a plurality of transmissive domains 222 configured for transmitting backlight for facilitating appropriate lighting of the display device. Each of the reflective domains 224 includes a plurality of reflective nano-particles distributed therein, thereon, and/or thereunder adapted for enhancing a reflecting ability thereof. In other words, the nano-particles can either be doped/implanted into the reflective domains 224 and/or coated/deposited onto at least one surface of each of the reflective domains 224. Preferably, each of the reflective domains 224 has a plurality of reflective nano-particles dispersed uniformly but randomly in the entire reflective domain 224 and/or on at least one surface of reflective domain 224. The nano-particles can, for example, be comprised of a material selected from a group consisting of Ag, Al, Ti, Cr, and Al—Ag alloy.

An appropriate distribution of sizes of the reflective nano-particle can result in a better color saturation. Sizes of the nano-particles are, for example, in the range from approximately 2 nm to approximately 2000 nm and preferably in either about in a range from 5 nm to 20 nm or about in a range from 300 nm to 1200 nm. Smaller reflective nano-particles should be very densely distributed, such that the reflective nano-particles can effectively cooperate with each other to reflect the ambient light. Each larger reflective nano-particle can work independently for reflecting the ambient light, and therefore larger reflective nano-particles can be distributed relatively sparsely.

For example, in a case of a single reflective domain 224, the sizes of the reflective nano-particles are distributed approximately in three different ranges, i.e. a first range, a second range and a third range. The reflective nano-particles with sizes in the first range are adapted for reflecting lights (i.e., light wavelengths) in the red light band. The reflective nano-particles with sizes in the second range are adapted for reflecting lights in the green light band. The reflective nano-particles with sizes in the third range are adapted for reflecting lights in the blue light band. The transmission/reflection ratio of the transflective layer 320 is determined by adjusting the quantity, size distribution, and reflectivity of the reflective nano-particles. Therefore, ideal color performance for the FDP 100 can be achieved by adjusting the quantity, size distribution and reflectivity of the reflective nano-particles.

The transflective layer 220 includes a matrix made of a transparent material and a plurality of reflective nano-particles distributed thereon or therein. Although the reflective domains 224 are substantially reflective, they may still allow some portions of backlight to pass therethrough. The reflective nano-particles distributed therein, thereon, and/or thereunder are randomly dispersed. Such reflective nano-particles are adapted for diffusely reflecting incident light from all directions and are adapted for scattering some backlight that is incident thereon. Furthermore, the reflective domains 222 are preferably configured in a given pattern and have either a long-distance and/or a short-distance order.

Figure 3:
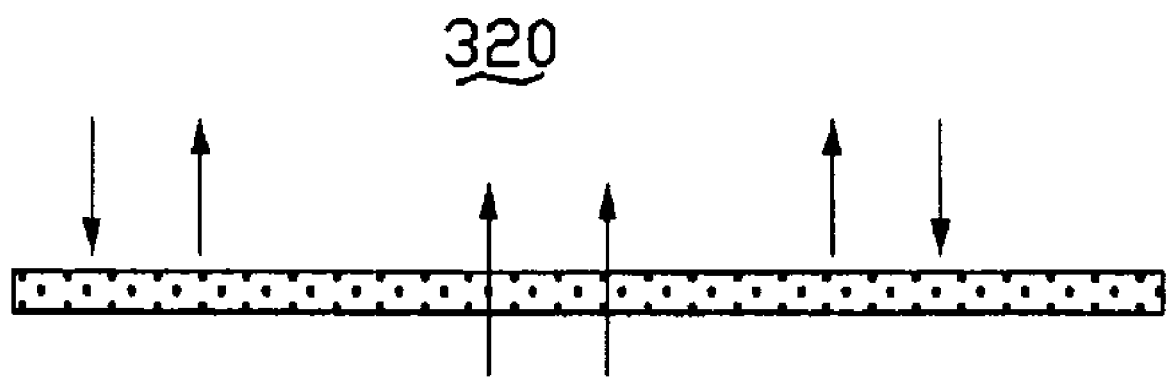
FIG. 3 is a schematic, partial cross-sectional view showing a transflective layer, according to another exemplary embodiment.

Another exemplary transflective layer 320, as shown in FIG. 3, is described as follows. The transflective layer 320 has a matrix and a plurality of reflective nano-particles incorporated therein, for reflecting ambient light. The reflective nano-particles are dispersed uniformly and randomly in the entire matrix of the transflective layer 320 and/or on at least one surface of the matrix of the transflective layer 320. When backlight is incident onto the transflective layer 320, the backlight is allowed to pass through the parts where few or none of the reflective nano-particles are distributed thereat and is then scattered by the reflective nano-particles in the areas where such nano-particles are more plentiful. When ambient light is incident onto the transflective layer 320, they are diffusely reflected back to the liquid crystal layer with the aid of the reflective nano-particles.

An appropriate distribution of sizes of the reflective nano-particle can be adjusted according to different practical situations so as to obtain a better color saturation. For example, sizes of the nano-particles can be discretely distributed. The discrete distribution of the nano-particles would have at least one peak and preferably three peaks, each peak corresponding to a concentrated range of nano-particle sizes. The three peaks, for example, would correspond to a first range, a second range and a third range. The reflective nano-particles with sizes in the first, second, and third ranges would be adapted for reflecting lights (i.e., light wavelengths) in the red, green, and blue light bands, respectively. The transmission/reflection ratio, as well as the color performance, of the transflective layer 320 is determined or may be adjusted by adjusting the quantity, size distribution, and/or reflectivity of the reflective nano-particles. It is to be noted that although three peaks are exemplarily illustrated herein, more or less peaks may be optionally selected in the application of the present display device by those skilled in the art and be within the scope thereof.

The foregoing transflective layer 220 or 320 is preferably formed on the lower substrate 104. The transflective layer 220 or 320 may alternatively be integrated as a whole with the lower substrate 104. For example, the lower substrate 104 of FIG. 1 can be doped/implanted and/or disposed/coated with a plurality of reflective nano-particles to form either a transflective layer 220, shown in FIG. 2, or a transflective layer 320, shown in FIG. 3. Such a lower substrate 104 may then function substantially as the transflective layer 220 or 320.

It is of an advantage that the transmissive reflective layer 120 can provide uniformly scattered and reflected light to the liquid crystal layer 110 for displaying. Similarly, it is of another advantage that the reflective domains 224 of the reflective layer 120 have a better reflectivity. It is of a further advantage that the reflective layer 120 can provide better color saturation.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transflective LCD device comprising:
   a liquid crystal layer; and
   a transflective layer comprising:
      a matrix made of a transparent material; and
      a plurality of reflective nano-particles configured for reflecting ambient light, the reflective nano-particles having grain sizes in the approximate range from 2 nm to 20 nm, said reflective nano-particles being dispersed uniformly and randomly in the entire matrix.

2. The transflective LCD device as described in claim 1, wherein the sizes of said reflective nano-particles are discretely distributed.

3. The transflective LCD device as described in claim 2, wherein the discrete distribution of said nano-particles has three peaks respectively corresponding to a first range, a second range, and a third range, wherein said reflective nano-particles with sizes in the first range are adapted for reflecting light of a red light band, said reflective nano-particle with sizes in the second range are adapted for reflecting light of a green light band, and said reflective nano-particles with sizes in the third range are adapted for reflecting lights of a blue light band.

4. The transflective LCD device as described in claim 1, wherein said reflective nano-particles are at least one of doped and implanted into said matrix.

5. The transflective LCD device as described in claim 1, wherein said reflective nano-particles are randomly dispersed and are adapted for diffusely reflecting incident lights from all directions.

6. The transflective LCD device as described in claim 1, further comprising a color filter disposed under the liquid crystal layer.

7. The transflective LCD device as described in claim 1, wherein the reflective particles are comprised of a reflective material selected from the group consisting of Ag, Al, Ti, Cr, and Al—Ag alloy.

8. The transflective LCD device as described in claim 1, further comprising an upper polarizer disposed on the liquid crystal layer and a lower polarizer disposed under the transflective layer.

9. The transflective LCD device as described in claim 8, further comprising an anti-glare layer coated on the upper polarizer.

10. The transflective LCD device as described in claim 9, further comprising an anti-reflection layer coated on the anti-glare layer.

* * * * *